Sept. 7, 1948. N. T. SIMOPOULOS 2,448,554

ULTRA-HIGH FREQUENCY TUNING UNIT

Filed Feb. 27, 1946

INVENTOR
NICHOLAS T. SIMOPOULOS
BY
William D. Hall.
ATTORNEY

UNITED STATES PATENT OFFICE 2,448,554

ULTRA HIGH FREQUENCY TUNING UNIT

Nicholas T. Simopoulos, Dayton, Ohio

Application February 27, 1946,
Serial No. 650,439½

3 Claims. (Cl. 250—40)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an ultra-high frequency tuner and more particularly to a wide range tuning unit that is tunable or variable by a single operation.

According to conventional practice variable capacitors and inductors are used in tuned circuits such as may be associated with vacuum tubes in local oscillators and the like. As is well understood in the art these components may be separately or gang tuned. Various arrangements have heretofore been devised in attempts to obtain optimum conditions as regards performance, ease of tuning adjustment and tuning range.

It is, therefore, an object of the present invention to provide a simplified tuning unit which provides a wide tuning range. It is another object of my invention to provide a tuner, especially useful in ultra-high frequency applications, in which the inductance and capacity are simultaneously varied by a single operation.

It is a further object of my invention to provide a tuning unit for ultra-high frequency applications having a tuning ratio greater than that of the prior art.

For a better understanding of the invention together with other and further objects thereof, reference is had to the following description, taken in connection with the accompanying drawings. The scope of the invention will be pointed out in the appended claims. In the accompanying drawings:

Figure 1:
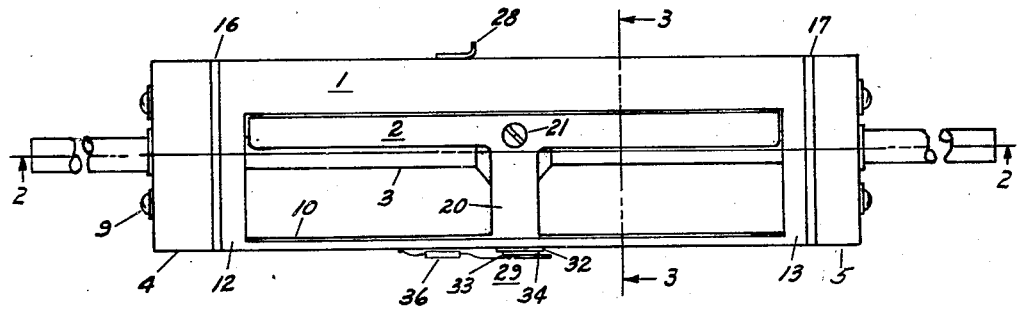
Fig. 1 is a plan view of an illustrative embodiment of the present invention.
Figure 2:
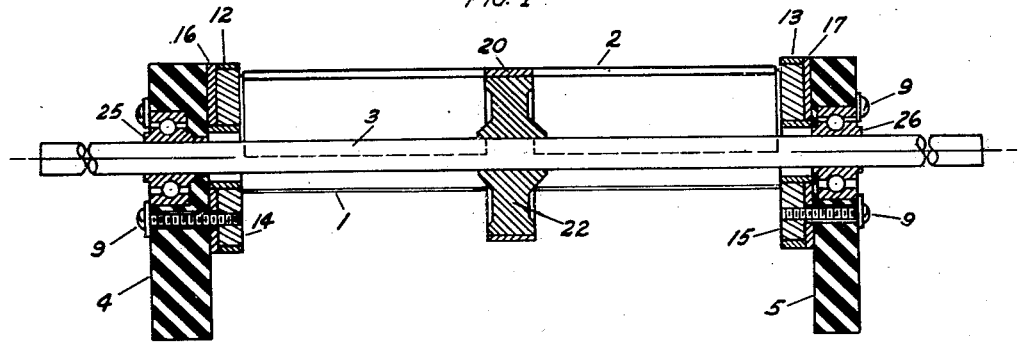
Fig. 2 is a sectional view taken along the line 2—2 of Fig. 1.
Figure 3:
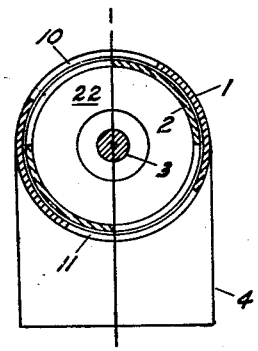
Fig. 3 is a sectional view taken along the line 3—3 of Fig. 1.

In general, the device that is shown in the accompanying drawing comprises a stator 1 in which is mounted a rotor 2 that is adjusted by operation of a shaft 3. The shaft 3 is journaled for rotation in a pair of insulating end supports 4 and 5 of the stator 1.

The stator 1 is a hollow cylinder having rectangular apertures 10 and 11 on opposite sides thereof and continuous end portions 12 and 13, providing a pair of outwardly disposed capacitor plates. Centrally apertured circular mounts 14 and 15 are disposed inwardly of the stator end portions 12 and 13, respectively, and are tapped and threaded to receive screws 9 that secure the stator 1 to the supports 4 and 5. End plates 16 and 17 are interposed between the mounts 14 and 15 and the supports 4 and 5, respectively, and, like the mounts 14 and 15 are insulated from the rotor 2. The rotor 2 is a hollow cylinder disposed within the stator 1 and slotted axially or cut away to provide a pair of rotor capacitor plates that are spaced radially from the capacitor plates of the stator 1. The axially extending slots in the rotor 2 provide rotor plates that underlie the plates of the stator 1, although preferably they are sufficiently larger in circumference than the plates of the stator 1 so that there is a slight overlap when the stator apertures 10 and 11 are completely closed by the capacitor plates of the rotor 2. The rotor 2 has a rib 20 intermediate its ends that preferably is a structurally continuous part of the plates of the rotor 2. The rotor plates terminate in ends that are spaced axially from the mounts 14 and 15 and remote from the rib 20. Screws 21 extend through the rotor rib 20 and thread into a rotor mount 22. The rotor mount 22 is secured by welding or the like to the shaft 3 so that the turning of the shaft 3 moves the rotor 2 with respect to the stator 1. The shaft 3 preferably is journaled in bearings 25 and 26 in the end supports 4 and 5, respectively.

Figure 4:
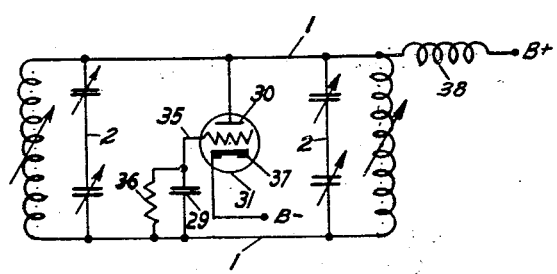
Fig. 4 is a schematic diagram that is illustrative of the invention.

A connector 28 is secured to the stator 1 on one side and intermediate the ends thereof for connection by soldering or the like to the plate 30 of a vacuum tube 31 shown in Fig. 4, with the shortest practical connection therebetween to minimize stray inductance. A capacitor 29, Figs. 1 and 4, comprising a layer of mica 32 and a capacitor plate 33 is secured to the stator 1 on the opposite side from the side carrying the connector 28 and intermediate the ends of the stator 1. The capacitor 29 so mounted has a connector 34 on the capacitor plate 33 for making connection by soldering or the like with the grid 35 of the tube 31 shown in Figs. 1 and 4, with the shortest practical connection to minimize stray inductance. A fixed resistor 36 shunts the capacitor plate 33 by being connected between the grid side of the capacitor 29 and the stator 1 as shown in Figs. 1 and 4. The cathode 37 of the tube 31 is connected to B— power supply, as shown. The described assembly comprises a complete tuned circuit for a local oscillator when viewed as shown in Fig. 4 wherein B+ power supply is applied through an inductor 38 and stator 1 to the plate 30 of the tube 31. The variable inductive-capacitive coupling afforded by the stator 1 and rotor 2 is represented in Fig. 4 by the networks of variable inductors and capacitors connected between the leads marked 1 which respectively correspond to the opposite sides of the stator 1.

A satisfactory operating model which has been constructed is 5½ inches long with a stator outside diameter of 1½ inches. In the model the stator 1 and rotor 2 plates are spaced from each other substantially 0.005 inch. When a type 955 vacuum tube is used as tube 31 in the circuit in Fig. 4, a tuning range of from 155 to 600 megacycles in 90° rotation of the shaft 3 is provided. When a type 446A "lighthouse" tube is used as tube 31 in the circuit in Fig. 4, a tuning range of from 160 to 970 megacycles in 90° rotation of the shaft 3 is provided. The by-pass capacitor 29 in the aforesaid model has a capacity of 10 micro-microfarads and the resistor 36 is a carbon resistor of 25,000 ohms.

In the installation of the device in a circuit the stator 1 is electrically connected by connector 28 to the plate 30 of the tube 31, and to the junction of the capacitor 29 and the resistor 36 remote from the grid 35. The cathode 37 of the tube 31 is electrically connected to the B— terminal of a power supply. When so installed, the illustrated device affords inductive-capacitive tuning by the single rotative adjustment of the rotor 2 with respect to the stator 1.

The tuning of the oscillator circuit may be varied by turning the shaft 3 to thereby cause the plates of the rotor 2 to increasingly or decreasingly close the apertures 10 and 11 in the stator 1. Such adjustment varies, in a single operation, both the capacitance and inductance in the circuit in which the device is connected. Capacitive tuning is provided since the capacitor plates, respectively comprising the stator 1 and rotor 2, afford maximum capacitance when most nearly overlying each other and minimum capacitance when the plates of the rotor 2 most nearly close the apertures 10 and 11 in the stator 1. The device also provides a plurality of inductive loops disposed to the right and left of the rib 20 of the rotor 2. The loops decrease in lateral dimension as the plates of the rotor more nearly close the apertures 10 and 11 in the stator 1.

Thus, the inductance and capacitance are both reduced by closing circumferentially the gap between the stator 1 and rotor 2. When the gap is fully open both the inductance and capacitance of the device are at their maximum values. The device provides more of a curve than a straight line variation for change of frequency with rotation.

The tuning device herein shown and described has the advantage that it is of simple construction, requires substantially no maintenance and is easy to operate. It should be noted that no direct electrical connection to the rotor 2 is required, thereby eliminating the need for wiping contacts and the like.

While there has been described what is at present considered the preferred embodiment of the invention, it will be obvious to those skilled in the art that various changes and modifications may be made therein without departing from the invention, and it is, therefore, aimed in the appended claims to cover all changes and modifications as fall within the true spirit and scope of the invention.

What is claimed is:

1. A radio frequency tuning unit having inductance and capacity variable by a single tuning operation, comprising stator means formed by a pair of arcuate plates united by structurally continuous arcuate end portions and spaced from each other to form a plurality of diametrical axial slots to provide inductive loops, rotor means formed by a pair of arcuate plates united intermediate their ends by a structurally continuous arcuate rib and spaced from each other to form a plurality of diametrical axial slots extending outwardly from said rib to the ends of said latter plates, said rotor means being radially spaced from said stator means to provide capacitance therebetween, and means for adjusting said rotor means circumferentially with respect to said stator means.

2. A radio frequency tuning unit having inductance and capacitance that are variable by a single tuning operation, comprising stator means formed by a hollow cylinder having a plurality of axial slots to provide a plurality of inductive loops, rotor means formed by a hollow cylinder having a plurality of axial slots that extend from the center outwardly to the ends thereof to form a rib intermediate said ends, said rotor being spaced radially from said stator to provide capacitance therebetween, and means for adjusting said rotor circumferentially with respect to said stator.

3. A radio frequency tuning unit having inductance and capacitance variable by a single tuning operation, comprising substantially cylindrical stator means apertured axially upon diametrically opposite sides to provide a pair of axially extending plates structurally continuous at the remote ends thereof to impart inductive loop characteristics thereto, support means at the remote ends of said stator means, a shaft coaxial with said stator means and journaled in said support means, a rotor mount carried by said shaft and disposed intermediate the ends of said stator means, and rotor means having a rib portion carried by said rotor mount and having a pair of plates extending axially of and terminating remote from the rib portion and spaced radially inwardly from said stator means to maintain both capacitive and inductive association therewith.

NICHOLAS T. SIMOPOULOS.

REFERENCES CITED

The following references are of record in the file of this patent:

UNITED STATES PATENTS

| Number | Name | Date |
|---|---|---|
| 1,986,081 | Streiffert et al. | Jan. 1, 1935 |
| 2,110,179 | Schmidt | Mar. 8, 1938 |
| 2,189,284 | Fritz | Feb. 6, 1940 |
| 2,384,504 | Thias | Sept. 11, 1945 |
| 2,395,928 | Willoughby | Mar. 5, 1946 |